Jan. 30, 1923.

A. O. FORSTER ET AL.
TRAP NEST.
FILED SEPT. 23, 1920.

INVENTORS
Albert O. Forster
Percy M. Forster
BY Chas. E. Townsend
ATTORNEY

Patented Jan. 30, 1923.

1,443,609

UNITED STATES PATENT OFFICE.

ALBERT ONSLOW FORSTER AND PERCY MARTIN FORSTER, OF BERKELEY, CALIFORNIA.

TRAP NEST.

Application filed September 23, 1920. Serial No. 412,279.

*To all whom it may concern:*

Be it known that we, ALBERT O. FORSTER and PERCY M. FORSTER, citizens of the United States, residing at Berkeley, in the county of Alameda and State of California, have invented new and useful Improvements in Trap Nests, of which the following is a specification.

This invention relates to a trap nest, and particularly pertains to improvements in trap nests of the character disclosed in our co-pending applications, Serial Nos. 288,975 and 345,841, filed April 10th, 1919, and December 18th, 1919, respectively, now Patents Nos. 1,386,327 and 1,394,485.

The principal object of the present invention is to provide means in connection with a trap nest having a inlet door and a pair of outlet doors by which the outlet doors may be alternately maintained in unlocked positions depending upon the presence of an egg upon a releasing member.

The present invention particularly contemplates the use of a housing within which a nest is positioned, said housing being formed with an entry door closable by the presence of a hen on the nest and further equipped with two exit doors, one of which is normally unlocked and the other of which is normally locked, said doors being provided with a correlated locking mechanism by which the doors may be alternately locked and unlocked as determined by the presence of an egg in operative relation to said mechanism.

The invention is illustrated by way of example in the accompanying drawings, in which—

Figure 1:
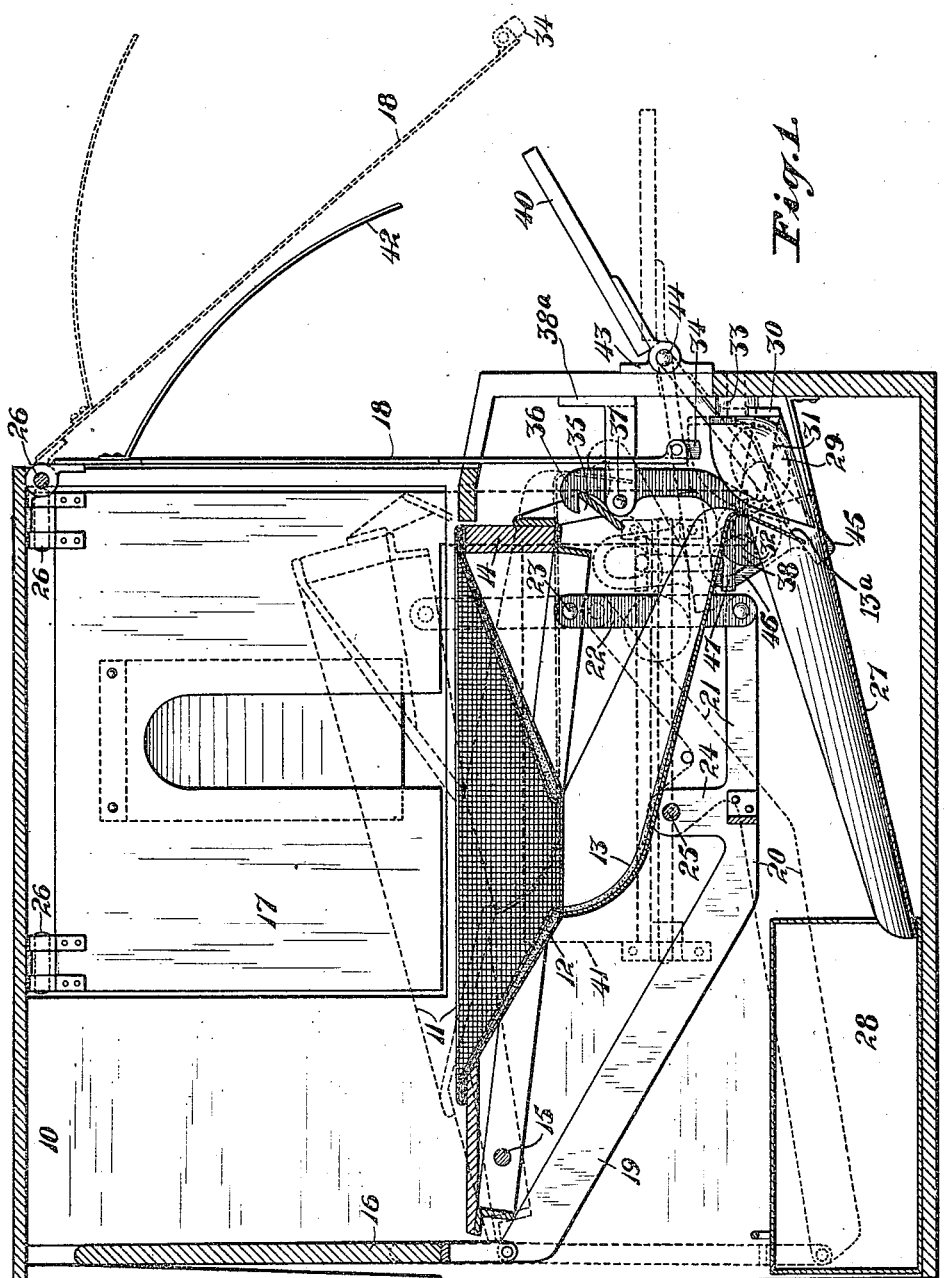
Fig. 1 is a view in central vertical section through the trap nest with which the present invention is concerned.
Figure 2:
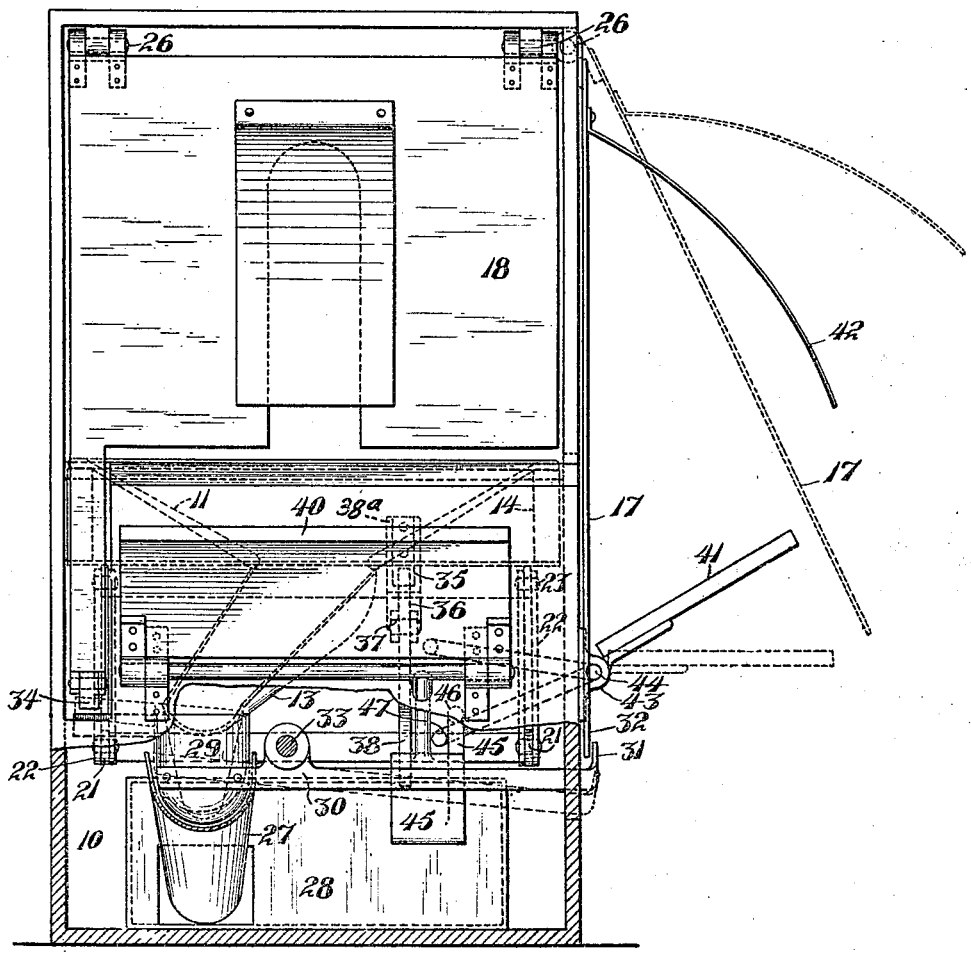
Fig. 2 is a view in front elevation showing the complete trap nest with parts broken away and more clearly disclosing the lock structure.

Referring more particularly to the drawings, 10 indicates a housing, within which a nest 11 is disposed. This nest is preferably formed of reticulated material, between the layers of which a filler 12 is placed to form a padded nest, and, at the same time, preventing the hen from disturbing the nest and clogging the egg outlet so that the eggs will be retarded in their travel along the inclined chute 13. The nest is supported upon a frame 14 preferably pivoted to the sides of the housing upon a shaft 15. This shaft is disposed near the front end of the housing, thus allowing the nest to have vertical swinging movement upon the pivot from the position indicated in solid lines in Fig. 1 to the dotted line position, it being understood that the normal position of the nest is as indicated by dotted lines.

The housing is formed with three doors, a vertically movable entry door 16 and a pair of exit doors 17 and 18 respectively. The exit door 17 will be hereinafter designated as the non-laying door and the door 18 as the laying door. With this designation in mind it is to be understood that the non-laying door opens to a pen reserved for the hens who do not lay, and the laying door opens to a separate pen reserved for the hens who have laid an egg while on the nest. The entry door 16 is vertically slidable and is supported by the rear arm 19 of a bent lever 20. This lever has a rearward arm 21 pivotally connected to a link 22. The link is in turn pivoted at 23 to the frame 14 and at the opposite end of the frame from the pivot 15. The bent lever is also formed with an offset fulcrum portion 24 by which it is mounted upon the fulcrum pin 25.

Due to this arrangement the downward movement of the nest from its dotted line position to the solid line position, as indicated in Fig. 1, will cause the door 16 to be projected upwardly over the doorway and will thus prevent the return of the hen through the entry opening. The doors 17 and 18 are mounted upon hinges 26 secured along their upper edges and which will permit these doors to swing outwardly when their locking mechanism is properly positioned. The threshold of each of the doorways is on a line substantially agreeing with the top of the nest when occupied, thus making it easy for the hen to pass out through the doorways normally closed by the doors 17 and 18. The gravity action of the doors will hold them in their closed positions and alternately operating lock mechanism will lock one of the doors in its closed position all the time.

The egg chute 13, which is rigidly secured to the bottom of the nest 12, extends rearwardly, and, when the nest is in its lowermost position, will properly register with a fixed egg chute 27. This egg chute communicates directly with a removable egg drawer 28 within which the eggs will accumulate during the day. Interposed between the lower end of the fixed chute 13 and the upper end of the chute 27 is a cup 29 through which the egg must pass in its travel from the nest through the two chutes and to the egg drawer.

This cup is mounted upon one end of a weight beam 30 which extends transversely of the housing 10. The other arm of the weight beam extends through the side wall of the housing and is formed with a catch member 31 which may move up in a manner to obstruct the outward swinging action of extension 32 carried by the door 17. The beam 30 is pivoted upon a shaft 33 at a desirable point intermediate its ends. This beam also carries an extension adapted to normally obstruct the movement of a pawl 34 carried upon the lower end of the door 18. It is held in this normal position, due to the fact that the lever arm of the beam engaging the egg cup is of less weight than the other arm, thereby holding the cup in its uppermost position, except when an egg is disposed therein.

By this arrangement the laying door 18 will be normally locked and the non-laying door will be unlocked, so that a hen entering the trap will be free to pass out through the side or non-laying door in the event that an egg is not laid, and, in case an egg is laid the locking beam 30 will be swung to unlock the door 18 and to lock the door 17. The nest is intended to be held in its occupied position until the hen has passed through one of the exit openings, after which, the nest will be released and the entry door 16 again opened.

This nest locking mechanism comprises a loop member 35 which is secured to the rearward swinging end of the nest frame 14 and extends downwardly therefrom. This loop is engageable by a locking trigger 36. The trigger is mounted upon a pivot pin 37 carried on a bracket 38ª. The lower end of the trigger is extended and forms a counterweight 38, which normally swings the catch portion of the trigger forwardly and in position to instantly engage and lock the nest when the loop passes over the catch. The trigger is released, due to the presence of the hen on one of the treadle members 40 or 41. The treadle 40 is disposed directly in front of the laying door 18 and the treadle 41 is disposed in front of the non-laying door. These treadles are normally covered by a fender 42, one of which is secured to each of the doors and prevents other hens from standing on the treadles. Each of the treadles is fitted with a hinge bracket 43 carrying a hinge pin 44 around which they may swing from an inclined position to a substantially horizontal position. The hinge structures also carry extensions. The extending portion on the treadle 40 is indicated at 45 and is seen to carry an eye member 46. Into this eye member extension 47 of the treadle 41 projects. The counterweighted end of the trigger 35 rests upon the upper face of the extension 45. Thus, when the treadle 40 is depressed, the extending portion 45 will swing upwardly, swinging the lower arm of the trigger upwardly and the catch portion of the trigger outwardly to release the nest. If the treadle 41 is depressed, the extension 47 will engage the top of the eye 46 and lift the extension 45, producing the same releasing action upon the trigger, as previously described.

In the operation of the present invention a hen enters the normally unobstructed entry opening and walks toward the rearward end of the nest. This will be instinctively done, due to the fact that cutaway portions 48 are formed in each of the doorways and will provide light which will attract the hen's attention. As the hen moves toward the exit openings, she will overbalance the nest, causing it to assume the horizontal position indicated by solid lines in Fig. 1. This will cause the loop member 35 to move downwardly and to become engaged by the catch portion of the trigger 36, thus holding the nest in its horizontal position until after the hen has passed from one of the two exit openings and has alighted on one of the treadles. Simultaneous with the downward movement of the nest the bent lever 19 will be swung from its dotted line position to the full line position in Fig. 1, at the same time projecting the entry door 16 upwardly to prevent the hen from returning through that opening. The exit doors will be maintained in their normal positions, that is, the door 17 normally unlocked and free to be swung open by the hen, while the door 18 is locked.

If an egg is laid it will roll down the runway 13 and into the egg cup 29 carried by the short arm of the weight beam 30. This will overbalance the beam and cause its end 31 to lock the door 17, while permitting the door 18 to be unlocked. The egg will remain in this position, due to the presence of a baffle plate 13ª on the end of the runway 13, until a hen has passed out through the doorway 18 and on to the treadle 39. At that time the treadle will swing downwardly and release the trigger 36, allowing the nest to swing upwardly and the baffle plate 13ª to move from its obstructing position. The egg will then roll down the runway 27 into the egg drawer 28 and all of the locking mechanism will be restored to its original condition so that the non-laying door will be unlocked and the laying door locked. At the same time the entry door will be dropped.

It will thus be seen that by the arrangement and construction here shown a trap nest is provided within which laying and non-laying hens may be automatically segregated.

While we have shown the preferred form of our invention as now known to us, we wish it understood that various changes in the construction, combination and arrangement of parts may be made by those skilled in the art without departing from the spirit of the invention as claimed.

Having thus described our invention, what we claim and desire to secure by Letters Patent is:

1. A trap nest comprising a housing having an entry door and a pair of exit doors, a nest within said housing, means actuated by the presence of a hen on the nest to close the entry door, lock means normally locking one of the exit doors and permitting the other one to remain unlocked, means associated therewith for causing an egg to reverse the locked condition of the exit doors and hold the lock means in its reversed condition until the hen has passed from the housing and an egg chute carried by the nest and having means for retaining the egg on the lock means.

2. A trap nest comprising a housing having an entry door and a pair of exit doors, a nest structure therein, means for closing the entry door and positively locking the same when a hen is on the nest, means for normally locking one of the exit doors, and adapted upon the delivery of an egg to the nest to release said locked exit door and lock the normally unlocked exit door and a chute carried by the nest and having a baffle for retaining the egg on the lock means to maintain the same in this condition and means whereby the departure of the hen from the housing will act to release and open the locked entry door and restore the lock mechanism of the exit doors to its normal condition.

3. A trap nest comprising a housing having an entry opening and a pair of exit openings therein, vertically swinging doors normally closing the exit openings, a vertically slidable door for closing the entry opening, a nest structure within said housing, means located beneath and positively connected with the nest structure and the slidable door and actuated by the presence of a hen on the nest structure to close the slidable entry door, lock means normally locking one of the exit doors and permitting the other to remain unlocked, and means associated therewith for causing an egg to reverse the locked condition of the exit doors and hold the lock means in its reversed condition until the hen has passed from the housing.

4. A trap nest comprising a housing having an entry opening and a pair of exit openings, vertically swinging doors normally closing said exit openings, a vertically slidable door for closing the entry opening, a nest structure within said housing, means including a lever located beneath the nest and connected to the bottom of the slidable door and with the nest structure to positively move upwardly and downwardly therewith, whereby the presence of a hen on the nest will act to close the vertically movable entry door, means for positively locking said door in its closed position, treadles arranged exteriorly of the housing and operable by the hen for unlocking the vertically slidable door, lock means normally locking one of the exit doors and permitting the other one to remain unlocked, and means associated with the lock means for causing an egg to reverse the locked condition of the exit doors and hold the lock means in its reversed condition until the hen has passed from the housing.

5. A trap nest including a housing having an entry opening and a pair of exit openings, a nest structure pivoted in the housing for upward and downward movement and counterbalanced so that the presence of a hen thereon will bring the nest structure to a horizontal position, lock means adapted to positively hold the nest in its horizontal position, a vertically slidable door positively connected with the nest structure whereby the movement of the nest to its horizontal position will close the said entry opening, treadle members mounted on the sides of the housing below the exit openings and on to which the hen must step when departing through either of the exit openings, means connected therewith whereby the presence of a hen thereon will release the nest locking means, permitting the nest to return to its original position and allowing the entry door to open, lock means normally locking one of the exit doors and permitting the other one to remain unlocked, and means associated therewith for causing an egg to reverse the locked condition of the exit door and hold the lock mechanism in its reversed condition until the hen has passed from the housing.

6. In a trap nest having an entry opening and a pair of exit openings, a horizontally pivoted nest structure therein, a pivoted catch arranged to engage and lock the nest structure when the same is moved to a horizontal position by the weight of a hen thereon, a pair of treadle members mounted exteriorly of the trap nest and arranged to disengage the catch from the nest when depressed by a hen leaving the trap nest, a normally open entry door and means connected with the nest whereon the presence of a hen thereon will close the entry door and hold it in its closed position until after the hen has alighted on one of the treadles.

7. In a trap nest having an entry opening and a pair of exit openings, horizontally pivoted nest structure therein, a loop member carried by the nest structure, a pivoted catch having a weighted arm maintaining the catch in engagement with the loop member when the nest structure is moved downwardly by the weight of a hen, a pair of treadle members located at the exit openings and arranged to release the nest structure from the said catch when depressed by the hen passing through an exit opening, a normally open entry door and means carried with the nest structure and with the entry door whereby the presence of a hen on the nest will close the entry door.

In testimony whereof we have hereunto set our hands in the presence of two subscribing witnesses.

ALBERT ONSLOW FORSTER.
PERCY MARTIN FORSTER.

Witnesses:
 WM. F. LOUNZ.
 SARAH M. FORSTER.